US010097580B2

(12) United States Patent
Aharon

(10) Patent No.: US 10,097,580 B2
(45) Date of Patent: Oct. 9, 2018

(54) USING WEB SEARCH ENGINES TO CORRECT DOMAIN NAMES USED FOR SOCIAL ENGINEERING

(71) Applicant: Microsoft Technology Licensing, LLC, Redmond, WA (US)

(72) Inventor: Arie Aharon, Haifa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 248 days.

(21) Appl. No.: 15/096,320

(22) Filed: Apr. 12, 2016

(65) Prior Publication Data

US 2017/0295202 A1    Oct. 12, 2017

(51) Int. Cl.
*H04L 29/06* (2006.01)
*G06F 17/30* (2006.01)

(52) U.S. Cl.
CPC .... *H04L 63/1483* (2013.01); *G06F 17/30887* (2013.01); *H04L 63/1416* (2013.01); *H04L 63/1425* (2013.01)

(58) Field of Classification Search
CPC ............. H04L 63/1483; H04L 63/1425; H04L 63/1416; G06F 17/30887
See application file for complete search history.

(56) References Cited

U.S. PATENT DOCUMENTS

| 6,772,208 B1 * | 8/2004 | Dutta | G06F 17/3089 |
| | | | 707/E17.116 |
| 6,988,100 B2 * | 1/2006 | Jackson | G06F 17/30864 |

(Continued)

FOREIGN PATENT DOCUMENTS

| CN | 102279875 | 12/2011 |
| CN | 101894134 | 4/2012 |

(Continued)

OTHER PUBLICATIONS

GlobalSign "The Detection and Prevention of Phishing Attacks. Protecting Websites From the Rising Threat of Phishing Attacks Whilst Safeguarding Customer Trust", GlobalSign White Paper, 4 P., Nov. 26, 2015.

(Continued)

*Primary Examiner* — Joseph P Hirl
*Assistant Examiner* — J. Brant Murphy

(57) ABSTRACT

A computer implemented method, comprising obtaining a first hyperlink associated with a first web resource accessible via a client terminal, converting one or more portions of the first hyperlink into a query comprising search terms(s) derived, at least partially, from the portion(s) of the first hyperlink, submitting the query to search engine(s) configured to search for information via the internet, receiving, from the search engine(s), search results associated with the query, the search results including one or more second hyperlinks, determining whether to replace the first hyperlink with a replacement hyperlink selected from the second hyperlink(s) based, at least partially, on a result of an analysis of similarity of the first hyperlink compared to each of the second hyperlink(s) and causing the client terminal to access either the first web resource associated with the first hyperlink or a second web resource associated with the replacement hyperlink based on the determination.

21 Claims, 3 Drawing Sheets

(56) References Cited

U.S. PATENT DOCUMENTS

| | | | |
|---|---|---|---|
| 7,406,498 B2* | 7/2008 | Reshef | G06F 17/3061 |
| | | | 707/E17.058 |
| 7,634,810 B2 | 12/2009 | Goodman et al. | |
| 7,698,442 B1* | 4/2010 | Krishnamurthy | G06F 21/51 |
| | | | 709/203 |
| 7,941,741 B1* | 5/2011 | Skillman | G06F 17/3089 |
| | | | 715/208 |
| 8,468,597 B1 | 6/2013 | Warner et al. | |
| 8,635,205 B1* | 1/2014 | Kang | G06F 17/30867 |
| | | | 707/711 |
| 8,701,185 B2 | 4/2014 | Krishnamurthy et al. | |
| 8,713,676 B2 | 4/2014 | Pandrangi et al. | |
| 8,856,937 B1 | 10/2014 | Wuest et al. | |
| 8,997,220 B2 | 3/2015 | Yu et al. | |
| 9,767,169 B1* | 9/2017 | Paff | G06F 17/30864 |
| 2002/0103823 A1* | 8/2002 | Jackson | G06F 17/30864 |
| | | | 715/236 |
| 2004/0083424 A1* | 4/2004 | Kawai | G06F 17/3089 |
| | | | 715/205 |
| 2005/0071748 A1* | 3/2005 | Shipp | G06F 17/30887 |
| | | | 715/205 |
| 2005/0198120 A1* | 9/2005 | Reshef | G06F 17/3061 |
| | | | 709/203 |
| 2007/0118528 A1 | 5/2007 | Choi et al. | |
| 2007/0156677 A1* | 7/2007 | Szabo | G06F 17/30522 |
| 2008/0162449 A1 | 7/2008 | Chao-Yu et al. | |
| 2009/0043874 A1* | 2/2009 | Kim | G06F 17/30887 |
| | | | 709/223 |
| 2009/0055928 A1 | 2/2009 | Kang et al. | |
| 2009/0292696 A1* | 11/2009 | Shuster | G06F 17/30867 |
| 2011/0276562 A1* | 11/2011 | Madden-Woods | |
| | | | G06F 17/30991 |
| | | | 707/722 |
| 2012/0304295 A1 | 11/2012 | Reumann et al. | |
| 2014/0259158 A1* | 9/2014 | Brown | G06F 21/554 |
| | | | 726/22 |
| 2014/0359760 A1 | 12/2014 | Gupta et al. | |
| 2015/0200963 A1 | 7/2015 | Geng et al. | |
| 2015/0381645 A1* | 12/2015 | Ding | G06F 21/51 |
| | | | 726/23 |
| 2016/0092589 A1* | 3/2016 | Kim | G06F 17/30864 |
| | | | 715/205 |

FOREIGN PATENT DOCUMENTS

| | | |
|---|---|---|
| CN | 102629261 | 8/2012 |
| CN | 103324615 | 9/2013 |

OTHER PUBLICATIONS

International Search Report and the Written Opinion dated May 31, 2017 From the International Searching Authority Re. Application No. PCT/US2017/026027. (16 Pages).

Hara et al. "Visual Similiarity-Based Phishing Detection Without Victim Site Information", Proceedings of the IEEE Symposium on Computational Intelligence in Cyber Security, CICS'09, Nashville, TN, USA, Mar. 30-Apr. 2, 2009, XP055371974, p. 30-36, Mar. 30, 2009.

Invernizzi et al. "EVILSEED: A Guided Approach to Finding Malicious Web Pages", Proceedings of the 2012 IEEE Symposium on Security and Privacy, SP'12, San Francisco, CA, USA, May 20-23, 2012, XP032456302, p. 428-442, May 20, 2012.

Khalili "Fiddler in Action—Part 1", Presentation at DDD Brisbane, Australia, XP055373162, p. 1-16, Aug. 25, 2011.

Khalili "Fiddler in Action—Part 2", Presentation at DDD Brisbane, Australia, XP055373164, p. 1-17, Aug. 26, 2011.

* cited by examiner

USING WEB SEARCH ENGINES TO CORRECT DOMAIN NAMES USED FOR SOCIAL ENGINEERING

BACKGROUND

Phishing is a substantial security threat in the field of information security. Phishing may include attempts to acquire sensitive information, such as, personal details, usernames, passwords and/or credit card details, mostly for malicious purposes, by masquerading as a trustworthy entity in an electronic communication environment, such as, a website on the internet. Phishing may entice users to provide sensitive information by luring unsuspecting users to visit fraudulent websites that appear to be legitimate websites.

Phishing attempts may use various different mechanisms to lure unsuspecting users to visit fraudulent websites, such as, a fraudulent site link included in an email message or an instant message, a fraudulent site link embedded in digital media, and/or a fraudulent site name retrieved in response to a search query associated with a public search engine.

Any version of phishing also may rely, at least in part, on the concept of social engineering, which generally may refer to the psychological manipulation of people into performing a particular action and/or divulging confidential information. Some social engineering techniques may rely on various conditions of human nature to convince a user to perform a particular action and/or divulge confidential information, such as preying on a person's need for human interaction, appealing to a person's sense of vanity and/or greed, and/or the like. The social engineering techniques may also include presenting the fraudulent website to the user in a manner that visually mimics a known legitimate website, but that includes relatively minor syntactic, semantic, and/or visual alterations to the legitimate website. In this manner, when the unsuspecting user selects the fraudulent link and visits the fraudulent website, the user may likely not be aware that he is visiting the fraudulent website instead of the legitimate website.

SUMMARY

According to some examples of the present disclosure, there are provided systems, methods and software program products for detecting hyperlinks associated with untrusted web resources and replacing them with trusted hyperlinks associated with trusted web resources using one or more search engines.

The methods, systems and software program products presented herein allow detecting hyperlinks associated with untrusted and/or fraudulent web resources presented or about to be presented to a user of a client terminal and replacing them with validated hyperlinks associated with trusted and/or legitimate web resources. More specifically, the methods, systems and software program products may allow detecting and replacing untrusted hyperlinks manipulated to deceive the user to access the untrusted web resources with hyperlinks associated with trusted webs resources. The replacement may be performed before hyperlink selection and/or before and/or during presentation of the manipulated hyperlinks. The hyperlink, for example a uniform resource indicator (URI), a uniform resource locator (URL), a domain name, a website address a server address and/or the like, which is suspected as manipulated, is analyzed and classified based on search engine results to identify a corresponding trusted hyperlink associated with a legitimate trusted web resource which the user probably intend accessing.

A hyperlink replacement module for analyzing and classifying the suspected hyperlinks may be executed locally at by client terminal and/or remotely by one or more remote network nodes, for instance a classification server.

The hyperlink replacement module executed at the client terminal may obtain the suspected hyperlink (also referred to as a first hyperlink) by analyzing content of digital media and/or documents rendered by one or more applications at the client terminal. The digital media and/or documents may include, for instance, a browser, a mail service application, a document reader or writer and/or the like and extracting the suspected hyperlink. Optionally, the suspected hyperlink extracted at the client terminal is transmitted by the client terminal to the hyperlink replacement module executed by the remote classification server. Additionally or alternatively, the hyperlink replacement module executed on a monitoring network node obtains the suspected hyperlink by monitoring network traffic coming in from the client terminal to intercept the suspected hyperlink.

The hyperlink replacement module creates a search query that includes one or more search terms derived at least partially from the suspected hyperlink and/or any part thereof. The search query is submitted to one or more search engines, for example, Bing™ search engine, Google™ search engine, Baidu™ and/or the like. In response to the search query, the search engine(s) provide search results comprising one or more result hyperlinks (also referred to as second hyperlinks). The number of result hyperlinks may be limited to include the most relevant results hyperlinks, for example, top 10 result hyperlinks, top 100 result hyperlinks or any intermediate or smaller number of hyperlinks.

The hyperlink replacement module analyzes the suspected hyperlink to evaluate and/or classify the validity, e.g., legitimacy and/or reliability of the suspected hyperlink according to the result hyperlink(s). The classification may be based on an analysis, for example, a syntactic analysis, a semantic analysis and/or a visual analysis of the suspected hyperlink to evaluate a syntactic, semantic and/or a visual similarity of the suspected hyperlink to the result hyperlink(s). In case the suspected hyperlink is determined to be a trusted hyperlink, i.e., associated with a trusted web resource, the client terminal may be allowed to access the web resource associated with the suspected hyperlink. When determined to be associated with an untrusted web resource, the suspected hyperlink may be replaced with a replacement hyperlink selected from the result hyperlink(s). The replacement hyperlink is selected by estimating the similarity of the suspected hyperlink to each of the result hyperlink(s) and selecting a result hyperlink presenting a highest similarity to the suspected hyperlink.

Applying the syntactic, semantic and/or visual analyses may allow overcoming social engineering methodologies wherein syntactic, semantic and/or visual alterations and/or manipulations are made to emulate trusted hyperlinks associated with trusted web resources in order to cause the user to access untrusted web resources.

Detecting hyperlinks associated with the untrusted web resources reduces or eliminates a user ability to access these web resources and hence reduces security threats. Harnessing the powerful publicly available search engines for detecting suspected hyperlinks and replacing them with trusted hyperlinks removes the need to update continuously black lists of untrusted web resources as done by existing methods for detecting the untrusted hyperlink.

Unless otherwise defined, all technical and/or scientific terms used herein have the same meaning as commonly understood by one of ordinary skill in the art. Although methods and materials similar or equivalent to those described herein can be used in the practice or testing of examples of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some examples of the disclosure are herein described, by way of example only, with reference to the accompanying drawings. With specific reference now to the drawings in detail, it is stressed that the particulars shown are by way of example and for purposes of illustrative discussion of examples of the disclosure. In this regard, the description taken with the drawings makes apparent to those skilled in the art how examples of the disclosure may be practiced.

In the drawings.

DETAILED DESCRIPTION

Figure 1:
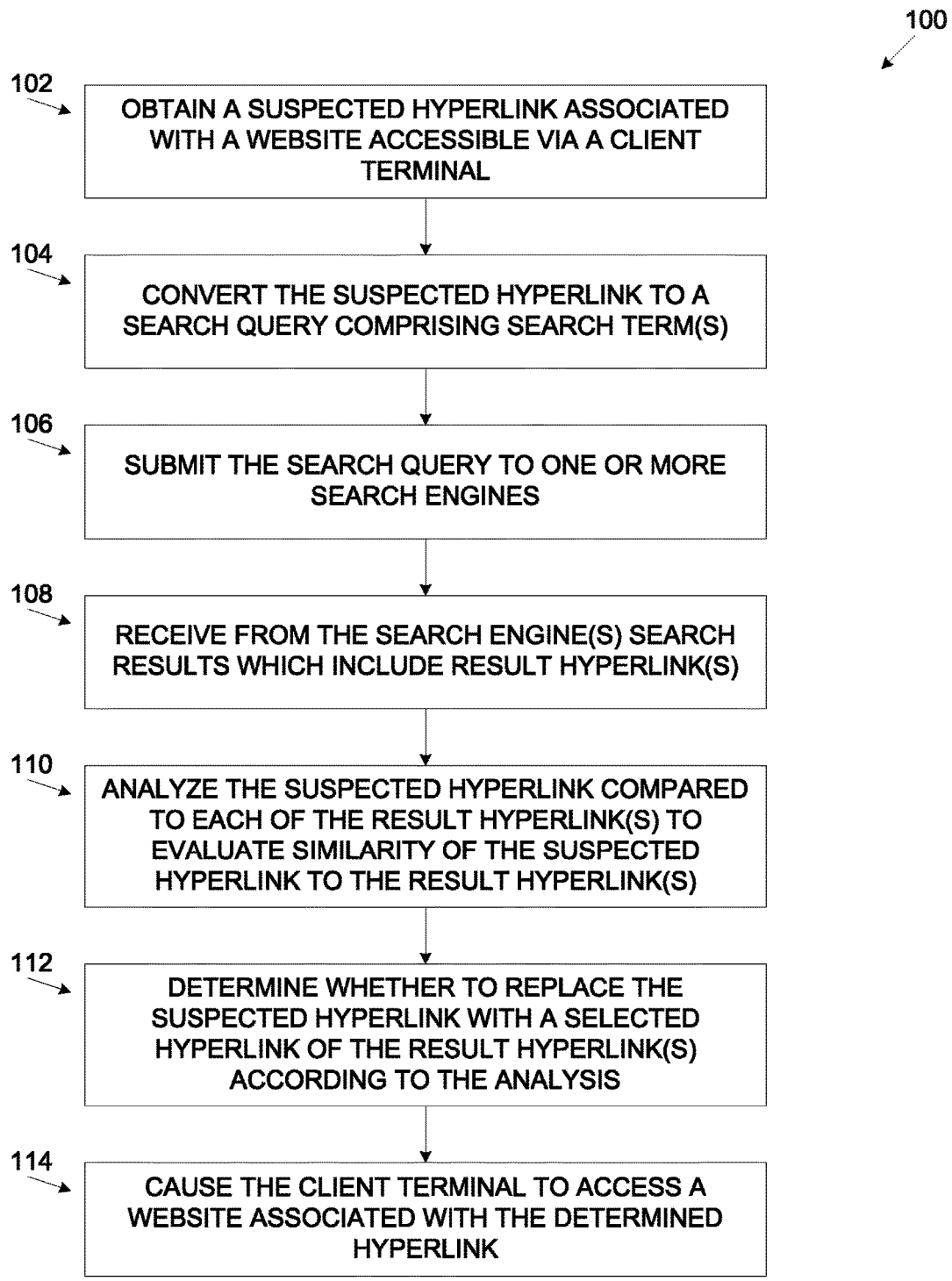
FIG. 1 is a flowchart of an exemplary process for detecting hyperlinks associated with untrusted web resources and replacing them with trusted hyperlinks associated with trusted web resources based on an analysis of search engine(s) results at a client terminal, according to some examples of the present invention.

According to some examples of the present disclosure, there are provided systems, methods and software program products for detecting hyperlinks associated with untrusted web resources and replacing them with trusted hyperlinks associated with trusted web resources using one or more search engines.

Before explaining at least one example of the exemplary examples in detail, it is to be understood that the disclosure is not necessarily limited in its application to the details of construction and the arrangement of the components and/or methods set forth in the following description and/or illustrated in the drawings and/or the Examples. The disclosure is capable of other examples or of being practiced or carried out in various ways.

Reference is now made to FIG. 1, which is flowchart of an exemplary process 100 for detecting hyperlinks associated with untrusted web resources and replacing them with trusted hyperlinks associated with trusted web resources based on an analysis of search engine results at a client terminal, according to some examples of the present invention. The process 100 is executed to prevent a user using a browser or an application executed at a client terminal from browsing or otherwise accessing untrusted web resources, such as fraudulent websites, false websites, fake websites, fraudulent servers, fraudulent domains and/or the like. The process 100 is based on a classification of a hyperlink suspected as associated with an untrusted web resource according to outputs of search engine(s). In case the suspected hyperlink is classified as untrusted, a replacement hyperlink is identified and presented or used instead of the suspected hyperlink. The replacement hyperlink is selected according to an analysis of search results provided by the search engine(s) and include hyperlinks to trusted web resources, for example, legitimate websites, authentic websites, trusted websites, trusted servers, trusted domains and/or the like.

Figure 2:
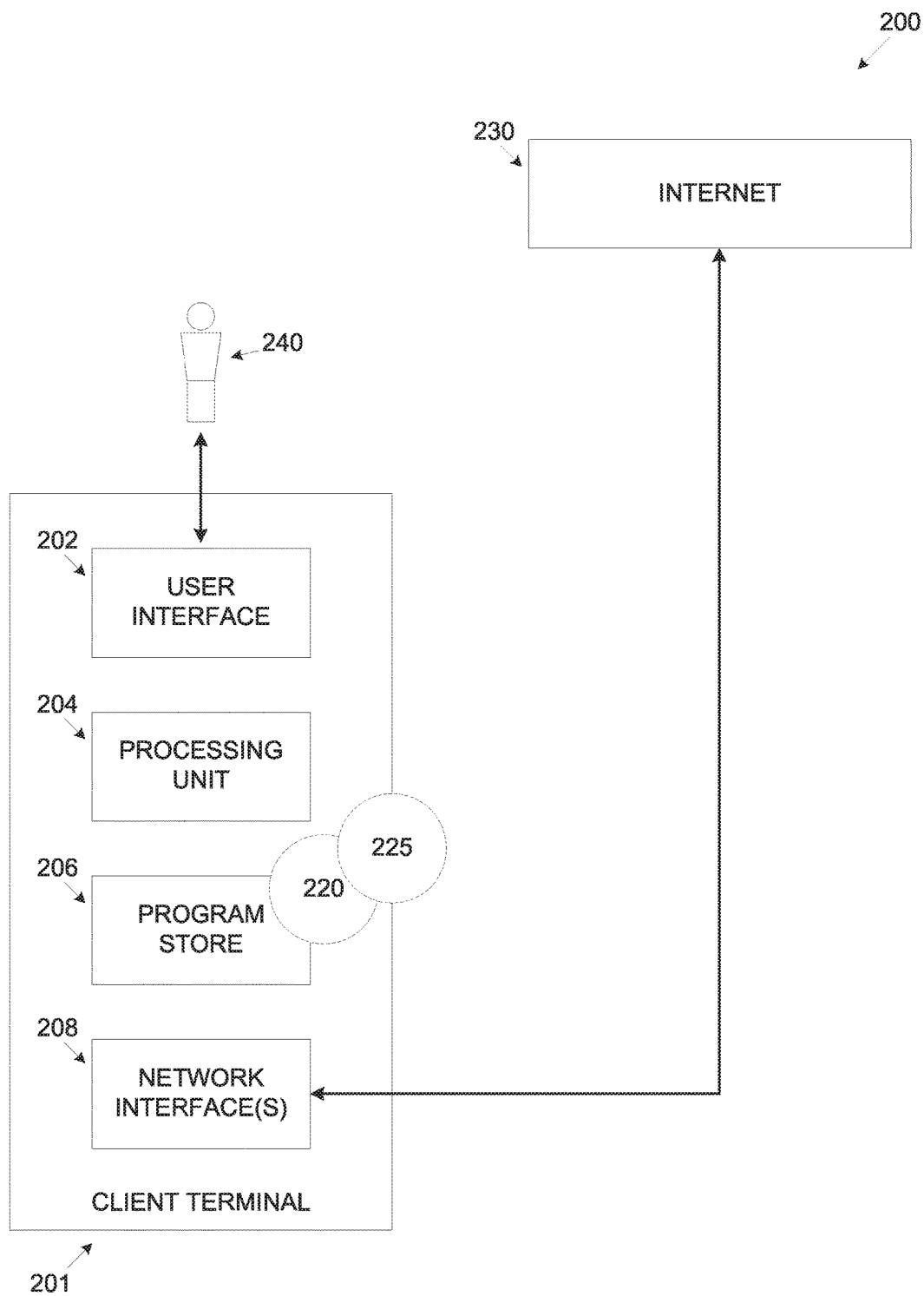
FIG. 2 is a schematic illustration of an exemplary system for detecting hyperlinks associated with untrusted web resources and replacing them with trusted hyperlinks associated with trusted web resources based on an analysis of search engine(s) results at a client terminal, according to some examples of the present invention.

Reference is now made to FIG. 2, which is a schematic illustration of an exemplary system 200 for processing untrusted hyperlinks based on an analysis of search engine(s) results at a client terminal 201, according to some examples of the present invention. The client terminal 201 may be a computer, a laptop, a Smartphone, a tablet, a server, one or more network nodes, a device having one or more computerized processors and the like. The client terminal 201 includes a man machine interface (MMI) 202 for receiving instructions from one or more users 240, a processor(s) 204, a program store 206 for storing code and a network interface 208 for communicating with one or more web resources on the internet 230 via a network. The MMI 202 may include one or more human interface devices, for example, a keyboard, a mouse, a touchpad, a display, a touchscreen and the like for interacting with the user 240 through, for example, a graphic user interface (GUI) provided by an operating system (OS) executed on the client terminal 201. The processor(s) 204, homogenous or heterogeneous, may be arranged for parallel processing, as clusters and/or as one or more multi core processor(s). The program store 206 may include one or more non-transitory, non-volatile devices, for example, a hard drive, a Flash array and the like for storing one or more software modules such, for example, a hyperlink replacement module 220 and a hyperlink extraction module 225. The hyperlink replacement module 220 and the hyperlink extraction module 225 comprise a plurality of program instructions that may be executed by the processor(s) 204. The network(s) 220 may include a local area network (LAN), a wide area network (WAN), a cellular network and/or the like.

The hyperlink replacement module 220 and/or the hyperlink extraction module 225 may operate as an add-on of a browser, a component of an application, a utility and/or a process of an OS. Optionally, the hyperlink replacement module 220 and/or the hyperlink extraction module 225 are independent of the OS and/or other software modules executed on the client terminal 201. The hyperlink replacement module 220 that classifies and replaces the suspected hyperlink communicates with the hyperlink extraction module 225 that extracts the suspected hyperlink at the client terminal 201.

The hyperlink extraction module 225 may connect to one or more applications executed at the client terminal 201 in order to detect and/or extract the suspected hyperlink. The hyperlink extraction module 225 may connect to the applications using an application programming interface (API) provided by the application(s).

Optionally, the hyperlink extraction module 225 may receive data from hardware component(s) of the client terminal 201, for instance the MMI 202 and/or a the network interface 208 of the client terminal 201, for monitoring input data received from the user 240. The hyperlink extraction module 225 may further connect and/or integrate with one or more software modules of the OS operating on the client terminal 201 in a kernel space and/or a user space. For example, kernel space modules(s), user space modules(s), device driver(s), library(s), network stack(s), dedicated software module(s) and the like in order to identify and/or extract the suspected hyperlink. For example, the hyperlink extraction module 225 may be deployed on the network driver of the OS of the client terminal 201 to monitor incoming and/or outgoing network communication traffic on the network 220 in order to identify and/or extract the suspected hyperlink.

The hyperlink replacement module 220 and/or the hyperlink extraction module 225 may operate transparently to normal activity at the client terminal 201. The transparent operation of the hyperlink replacement module 220 and the hyperlink extraction module 225 is direct to avoid requesting, requiring and/or prompting any special operation from the user 240.

Figure 3:
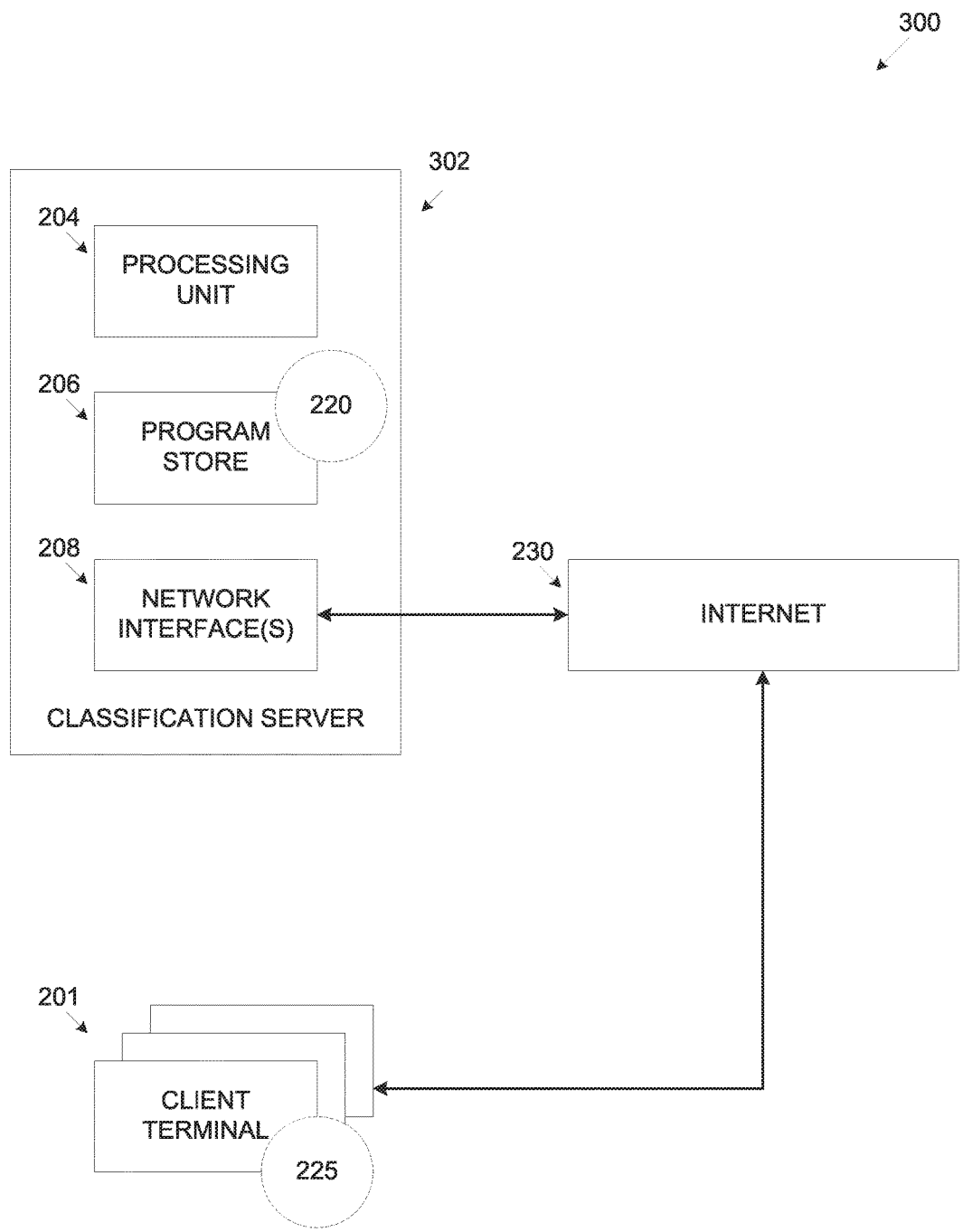
FIG. 3 is a schematic illustration of an exemplary system for detecting hyperlinks associated with untrusted web resources and replacing them with trusted hyperlinks associated with trusted web resources based on an analysis of search engine(s) results at a remote classification network node, according to some examples of the present invention.

Reference is now made to FIG. 3, which is a schematic illustration of an exemplary system 300 for processing untrusted hyperlinks based on an analysis of search engine(s) results at a remote classification server, according to some examples of the present invention. The system 300 includes a classification server 302, for example one or more computing servers and/or virtual machines connected to the network. The classification server 302 includes one or more processor(s) such as the processor(s) 204 adapted to execute a hyperlink replacement module 220 stored in a program store such as the program store 206. The classification server 302 further includes one or more network interfaces such as the network interface 208 for communicating with the internet 230 and one or more client terminals such as the client terminal 201. The classification server 302 may be implemented as a cloud service for example as a software as a service (SaaS).

Optionally, the classification server 302 is part of a network infrastructure connecting the client terminals 201 to the internet 230, for example, a gateway, a firewall server, a proxy server, an internet provider service (ISP) provider and/or the like. The hyperlink replacement module 220 executed by the classification server 302 may detect and/or extract the suspected hyperlink by monitoring network traffic coming in from the client terminals 201.

Reference is made once again to FIG. 1. First, as shown at 102, the hyperlink replacement module 220 obtains the suspected hyperlink from the hyperlink extraction module 225. The hyperlink extraction module 225 extracts the suspected hyperlink by monitoring digital documents rendered on a display of the client terminal 201, for example, a web browser, a mail service application, a document reader or writer and/or the like. Optionally, the hyperlink extraction module 225 may detect and/or extract the suspected hyperlink by monitoring network traffic going out of the client terminal 201. In case the hyperlink replacement module 220 is executed locally at the client terminal 201, the hyperlink extraction module 225 transfers the suspected hyperlink to the hyperlink replacement module 220 through one or more functions and/or an API of the hyperlink replacement module 220. In case the hyperlink replacement module 220 is executed remotely at the classification server 302, the hyperlink extraction module 225 transmits the suspected hyperlink to the hyperlink replacement module 220 over the network and/or the internet 230.

Now, as shown at 104, the hyperlink replacement module 220 analyzes the obtained suspected hyperlink (first hyperlink) and/or one or more portions thereof to derive one or more search terms. The hyperlink replacement module 220 creates a search query comprising the search term(s). The search terms may include one or more portions of the suspected hyperlink that may be associated with one or more web resources the user 240 is probably trying to access and/or believes he accesses. For example, a suspected hyperlink such as nato(dot)nshq(dot)in may be converted to a search query comprising one or more of the search terms nato, nshq, (dot)nshq(dot)in and/or nato(dot)nshq(dot)in. The hyperlink replacement module 220 constructs the search query using the search terms, part(s) of the search term(s) and/or a combination of the search terms.

The hyperlink replacement module 220 may create additional search queries to address additional search segments and/or search characteristics. For example, one or more search term(s) is added to focus the search in a specific area of interest such as for example, finance, defense, education, shopping and the like. For example, in case the suspected hyperlink comprises the suffix "org" the hyperlink replacement module 220 may add one or more search terms, for example, "ministry" to focus the search query to state and/or administration legitimate websites.

As shown at 106, the hyperlink replacement module 220 submits the search query to one or more public search engines, for example, Bing™ search engine, Google™ search engine, Baidu™ and the like. Optionally, the hyperlink replacement module 220 submits the search query to one or more special search engines that may not be available and/or accessible to the general public but rather to individuals, groups and/or organizations authorized to use the private search engine(s). The special search engine(s) may include search engines developed and/or owned by, for example, commercial companies and/or entities, governmental entities, intelligence agencies and the like. The special search engines may further include search engines, which require a subscription and/or a use fee. The hyperlink replacement module 220 may submit the search query to the search engine(s) using an API provided by the respective search engine(s).

As shown at 108, in response to the search query, the hyperlink replacement module 220 receives search results from the search engine(s). The search results collected by the search engine(s) by searching the internet 230 comprise one or more result hyperlinks (also referred to as second hyperlinks) associated with one or more web resources relating and/or corresponding to the search term(s) included in the search query. The hyperlink replacement module 220 may obtain the search results from the search engine(s) using the API provided by the respective search engine(s).

For example, the hyperlink replacement module 220 extracts a suspected hyperlink nato(dot)nshq(dot)in. the hyperlink replacement module 220 creates a search query comprising the search term nato(dot)nshq(dot)in and submits the search query to the Bing™ search engine. The Bing™ search engine may provide the following search results:

(1) NATO-NSHQ
 https://www(dot)nshq(dot)nato(dot)int
(2) NATO Special Operations Headquarters—NSHQ
 https://www(dot)facebook(dot)com/NATOSpecialOperationsHeadquarters
(3) NATO—Topic: Special Operations Forces
 www(dot)nato(dot)int/cps/en/natolive/topics_105950(dot)htm
(4) SHAPE|NATO SOF: Bridging the GAP
 www(dot)shape(dot)nato(dot)int/nato-sof-bridging-the-gap (5) NATO's NSHQ Targeted by Attack Leveraging Hurricane . . .
blog(dot)trendmicro(dot)com/trendlabs-security-intelligence/natos-nshq . . .
(6) NSHQ Senior Steering Group membership|IFPA
www(dot)ifpa(dot)org/research/researchPages/SSGmembership(dot)php
(7) NATO Special Operations Headquarters (NSHQ)— . . .
www(dot)shadowspear(dot)com/2012/02/nato-special-operations-headquarters-nshq
(8) Top 23 Nshq profiles|LinkedIn
https://www(dot)linkedin(dot)com/title/nshq
(9) Jose Antonio Shape NATO|LinkedIn
https://www(dot)linkedin(dot)com/in/jose-antonio-shape-nato-3b05ab36
(10) NATO|SOFREP
https://sofrep(dot)com/tag/nato
(11) Jose Antonio Shape NATO|LinkedIn
https://www(dot)linkedin(dot)com/in/jose-antonio-shape-nato-3b05ab36
(12) Q&A with Lieutenant General Brad Webb, commander of NATO NSHQ
sofrep(dot)com/47776/47776
(13) NSHQ—Info-News
info-news(dot)eu/tag/nshq
(14) NATO|SOFREP
https://sofrep(dot)com/tag/nato
(15) NATO's land forces: Losing ground-AEI
www(dot)aei(dot)org/publication/natos-land-forces-losing-ground
(16) Coast|Branded Merchandise & Event Solutions
go-coast(dot)co(dot)uk
(17) NATO Special Operations Headquarters
www(dot)specops-dhp(dot)com/ . . . /nato-special-operations-headquarters
(18) ERNESTO ZARCO—Google+
https://plus(dot)google(dot)com/102670787541447326500
(19) Snort(dot)Org
https://www(dot)snort(dot)org/advisories/vrt-rules-2014-12-04
(20) Showcases—Prisma IT
https://www(dot)prisma-it(dot)com/showcases Naturally, the search results may change according to one or more parameters, for example, a type of the search engine, a user, a geographical location, a date (earlier vs. later), a service provider for the internet and the like.

Optionally, the hyperlink replacement module 220 limits the number of search results such that the hyperlink replacement module 220 uses only some of the search results and/or result hyperlinks during the analysis and classification. For example, the hyperlink replacement module 220 may select the first (top) search results provided by the search engine(s), for example, 5, 10 and/or 20 top search results and/or result hyperlinks. Optionally, the relevancy of the selected search results is assessed by, for example, the order of the search results in a listing provided by the search engine and the like. Optionally, the hyperlink replacement module 220 submits the search query to additional search engines and selects the most relevant search results provided by the search engines. For example, the hyperlink replacement module 220 may submit the search query to three different search engines, for example, Bing™ search engine, Google™ search engine and Baidu™. The hyperlink replacement module 220 may then select four search results provided by the Bing™ search engine, four search results provided by the Google™ search engine and two search results provided by Baidu™. The hyperlink replacement module 220 may determine which search results to select to ranking of the search engines, which may be assigned by the hyperlink replacement module 220 to each of the search engines during previous search queries.

As shown at 110, the hyperlink replacement module 220 analyzes each of the result hyperlinks compared to the suspected hyperlink to evaluate whether the suspected hyperlink is trusted, i.e. associated with a trusted web resource or untrusted, i.e. associated with an untrusted web resource. The hyperlink replacement module 220 may evaluate similarity between the suspected hyperlink and hyperlinks in results to the search query, for example syntactic similarity, semantic similarity and/or a visual similarity. The hyperlink replacement module 220 may apply the analysis to the complete string of the result hyperlinks compared to the string of the suspected hyperlink and/or one or more portions of the strings of the result hyperlinks and the suspected hyperlink. Using the syntactic, semantic and/or visual analyses over the suspected hyperlink compared to the result hyperlinks may allow the hyperlink replacement module 220 to detect manipulation performed on the suspected hyperlink using social engineering. For example, the hyperlink replacement module 220 may detect one or more syntactic alterations, for example, a character difference, a symbol difference and/or the like in the string of the suspected hyperlink compared to the string of the result hyperlinks by applying the syntactic analysis. Similarly, the hyperlink replacement module 220 may detect one or more semantic alterations, for example, a string with a spelling alteration that the user 240 may confuse with another string and/or the like by applying the semantic analysis. In the same way, the hyperlink replacement module 220 may detect one or more visual alterations, for example, a character and/or a symbol which by applying the syntactic analysis. The visual alteration(s) may allow the suspected hyperlink to maintain syntactic and/or semantic similarity with a trusted hyperlink counterpart; however, the suspected hyperlink may be associated with an untrusted web resource. Applying the syntactic, semantic and/or visual analyses is highly effective since syntactic, semantic and/or visual alterations to a trusted hyperlink are major deception strategies employed by the social engineering techniques.

Based on the analysis, the hyperlink replacement module 220 may further assign a similarity score to each of the result hyperlinks to identify the similarity such as, syntactic similarity, semantic similarity and/or visual similarity of each of the result hyperlinks compared to the suspected hyperlink. The hyperlink replacement module 220 may calculate the similarity score based on the results of one or more of the analyses, for example, the syntactic analysis, the semantic analysis and/or the visual analysis.

As shown at 112, based on the analysis results, the hyperlink replacement module 220 determines whether the suspected hyperlink is a trusted hyperlink or an untrusted, i.e. a fraudulent hyperlink. The hyperlink replacement module 220 determines the validity of the suspected hyperlink by evaluating the similarity of the suspected hyperlink to each of the result hyperlinks where the result hyperlinks estimated to be associated with trusted web resources. In case the hyperlink replacement module 220 detects one or more alterations typical of social engineering in the string of the suspected hyperlink compared to one or more of the result hyperlinks, the hyperlink replacement module 220 determines that the suspected hyperlink is untrusted. In case the hyperlink replacement module 220 identifies from the analyses that the suspected hyperlink is identical to a result hyperlink associated with a trusted web resource, the hyperlink replacement module 220 determines that the suspected hyperlink is trusted and designates it as a determined hyperlink. In case the hyperlink replacement module 220 determined the suspected hyperlink is untrusted, the hyperlink replacement module 220 may replace the suspected hyperlink with a replacement hyperlink selected from the result hyperlinks, designated as the determined hyperlink. Optionally, the replacement hyperlink is selected according to the similarity score the hyperlink replacement module 220 calculated for each of the result hyperlinks during the analysis at 110.

Following the presented example, the suspected hyperlink nshq(dot)nato(dot)int may be replaced with the result hyperlink nshq(dot)nato(dot)int which is the first result hyperlink a search results listing provided by Bing™ search engine. The result hyperlink nshq(dot)nato(dot)int may present the highest similarity score resulting from the syntactic analysis of the strings of the suspected hyperlink compared to the result hyperlinks.

As another example, a suspected hyperlink natoexhibitionff14(dot)com is submitted to the search engine(s) as the search query comprising the search terms nato and exhibition. The first search result in the listing of search results provided by Google™ is Future Forces 2016—12th international exhibition in Prague which includes a result hyperlink www(dot)natoexhibition(dot)org. The result hyperlink www(dot)natoexhibition(dot)org may present the highest similarity score as calculated by the syntactic and/or semantic analyses. The suspected hyperlink natoexhibitionff14(dot)com is replaced with the result hyperlink www(dot)natoexhibition(dot)org.

In another example, a suspected hyperlink login-osce(dot)org is submitted to the search engine(s) as a search query. The search results returned by Bing™ may include, for example, the result hyperlink https://webmail(dot)osce(dot)org, login(dot)osce(dot)org among other result hyperlinks. The result hyperlink login(dot)osce(dot)org may exhibit the highest similarity score as calculated by the syntactic and/or semantic analyses and may therefore be selected as a replacement hyperlink to replace the suspected hyperlink login-osce(dot)org.

As another example, a user may try to access a suspected hyperlink lögin-osce(dot)org which includes the German character ö. Following detection of the suspected hyperlink, the search query submitted to the search engine(s) may include one or more search terms, for example, login-osce(dot)org, lögin-osce, and the like. The search results returned by the search engine(s), for example, Bing™ may include, for example, the result hyperlink login-osce(dot)org. The syntactic and/or sematic analyses may fail to identify the suspected hyperlink as a socially engineered hyperlink differing from the result hyperlink counterpart, login-osce(dot)org as both present similar syntactic and/or semantic attributes. The visual analysis however may detect the visual difference between the German character ö and the English counterpart o and assuming the result hyperlink login-osce(dot)org presents the highest similarity score compared to all other result hyperlinks, the result hyperlink login-osce(dot)org are designated as the replacement hyperlink to replace the suspected hyperlink login-osce(dot)org.

Optionally, prior to submitting the suspected hyperlink to the search engine(s), the hyperlink replacement module 220 compares the suspected hyperlink to one or more previously used hyperlinks frequently used by the user 240 using the client terminal 201. The frequently used hyperlinks, for example hyperlinks frequently used by the user(s) 240 of the client terminal 201 and/or by users in the same of organization of the user(s) 240 are estimated to be trusted. The frequently used hyperlink(s) is locally stored on the client terminal 201 and/or in a central entity accessible from the client terminal 201 via one or more networks.

Optionally, when no result hyperlinks are received from the search engine, the hyperlink replacement module 220 classifies the suspected hyperlink by submitting the suspected hyperlink to one or more text completion predictive engines of the search engine(s). The predicative engine(s) may be predicting one or more candidate hyperlinks associated with trusted web resources based on, for example, a text completion prediction for the suspected hyperlink or any portion thereof. The hyperlink replacement module 220 may use the predicted candidate hyperlink(s) to estimate the validity of the suspected hyperlink. The hyperlink replacement module 220 may further calculate the similarity score for each of the predicted candidate hyperlinks such that in case the suspected hyperlink is determined untrusted, the hyperlink replacement module 220 may select a replacement hyperlink presenting the highest similarity score among the predicted candidate hyperlink(s).

For example, the suspected hyperlink natoexhibitionff14 (dot)com is submitted to one or more of the search engines text completion predictive engines. In response to submitting the term nato exhib to Google™, Google™ may present a listing of results comprising among other results the following exemplary predicted result:
Future Forces 2016—12th International Exhibition in Prague
www(dot)natoexhibition(dot)org/

| | |
|---|---|
| BG Maria R Gervais; NATO Rainer Schulte COL Rainer Schulte; Germany Karl-Heinz Rippert; Czech Republic Richard Macha LTC Ret. Richard Macha; Czech . . . | |
| Conference Future Crises general partner of conference. | FF16 FF16; FS WS; US WS; CL WS; |
| Future Crises Conference 2014 . . . | CBRN WS; Be Ahead; Future . . . |
| News Releases | Reasons to Exhibit |
| News Releases. Newsletter archive. Mar. 3, 2016 The Czech . . . | Reasons to Exhibit. FF16 is organized for your benefit and . . . |
| FF14 | Conference Scope and Topics |
| FF14 - title. . . . FF14 © 2010-2015 | Conference Scope and Topics. |
| FF14, title, rights. Created by . . . | Future Crises Conference 2014 . . . |

Among the group of suspected hyperlinks in the above prediction results provided by Google™ is the candidate hyperlink FF14. Applying the semantic and/or syntactic analyses on the candidate hyperlink FF14 and/or the text associated with the candidate hyperlink presents best similarity to the suspected hyperlink. The candidate hyperlink FF14 may therefore be selected to replace the suspected hyperlink to cause the user 240 to access the trusted web resource associated with the replacement hyperlink.

As shown at 114, based on the determination at step 112, the hyperlink replacement module 220 causes the client terminal 201 to access a web resource associated with the determined hyperlink. In case the hyperlink replacement module 220 is executed by the client terminal 201, the determined hyperlink may be provided hyperlink extractor module 225, using for example, an API of the hyperlink replacement module 220. The hyperlink extractor module 225 may insert it back in the access flow of the client terminal 201, for example, by feeding it back to the network driver, the network stack, the MMI 202 and/or through the API of the application through which the suspected hyperlink is extracted. By feeding the determined hyperlink back to the client terminal 201, the user 240 using the client terminal 201 is directed to access the web resource associated with the determined hyperlink. When the hyperlink replacement module 220 is executed by a remote classification server such as the classification server 302, the hyperlink replacement module 220 may transmit the determined hyperlink to the hyperlink extractor module 225 over one or more networks and/or the internet 230. Optionally, when the classification server 302 is a gateway like server, the hyperlink replacement module 220 may use the determined hyperlink to access the associated trusted web resource and establish a session with the trusted web resource which the client terminal 201 may take over.

Executing the hyperlink replacement module 220 at the classification server 302 for centrally handing social engineering threats may provide enhanced efficiency and possibly cost reduction for private users as well as organizations comprising multiple client terminals such as the client terminal 201. Using the hyperlink replacement module 220 may avoid the need to assign additional resources to each of the client terminals 201 by detecting, classifying and/or replacing the suspected hyperlink centrally for a plurality of client terminals 201. Furthermore, previously accessed hyperlinks used by a plurality of users over a plurality of client terminals 201 are efficiently managed centrally by the server 302.

It is expected that during the life of a patent maturing from this application many relevant user interfaces and/or web search methodologies will be developed and the scope of the terms user interface and web search engine respectively are intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

Throughout this application, various examples of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

According to some examples of the present invention there is provided a computer implemented method that is based on obtaining a first hyperlink associated with a first website accessible via a client terminal, converting one or more portions of the first hyperlink into a query comprising one or more search term derived, at least in part, from the one or more portion of the first hyperlink, submitting the query to one or more search engines configured to search for information via the internet, and receiving, from the one or more search engines, search results associated with the query The search results include one or more of a plurality of second hyperlinks. The method further includes determining whether to replace the first hyperlink with a replacement hyperlink selected from the one or more second hyperlink based, at least in part, on a result of an analysis of similarity of the first hyperlink compared to each of the one or more second hyperlink and causing the client terminal to access either the first website associated with the first hyperlink or a second website associated with the replacement hyperlink based on the determination.

The hyperlink may be a member selected from a group consisting of a URI, a URL, a domain name and/or a website address.

The first hyperlink may be extracted from a digital document having at least a portion thereof rendered by an application executed by a processor of the client terminal.

The first hyperlink may be received from the client terminal.

The first hyperlink may be extracted from network traffic from the client terminal by monitoring the network traffic to intercept the first hyperlink.

Optionally, a number of the plurality of second hyperlinks is limited prior to the analysis.

The similarity may be one or more of a syntactic similarity, a semantic similarity and/or a visual similarity.

The analysis may include one or more of a syntactic analysis, a semantic analysis and/or a visual analysis.

The analysis may evaluate a similarity of the first hyperlink compared to the one or more second hyperlink.

The analysis may produce a similarity score for the each of the one or more second hyperlinks to identify the replacement hyperlink having a highest similarity. The similarity score is calculated by analyzing a respective one of the one or more second hyperlink compared to the first hyperlink.

The method may further include replacing the first hyperlink with a previously used hyperlink by analyzing the first hyperlink compared to each of one or more of a plurality of previously used hyperlinks previously used by the client terminal.

Optionally, a candidate hyperlink is identified to replace the first hyperlink when the search results include none of the plurality of second hyperlinks by applying the first hyperlink to a text prediction predictive engine of the one or more search engines for predicting the one or more second hyperlinks from the first hyperlink.

According to some examples of the present invention there is provided a system, comprising a program store storing a code and one or more processors coupled to the program store for executing the stored code. The code comprising:

Code instructions to obtain a first hyperlink associated with a first website accessible via a client terminal.

Code instructions to convert one or more portions of the first hyperlink into a query comprising one or more search term derived, at least in part, from the one or more portions of the first hyperlink.

Code instructions to submit the query to one or more search engines configured to search for information via the internet.

Code instructions to receive, from the one or more search engines, search results associated with the query. The search results include one or more of a plurality of second hyperlinks.

Code instructions to determine whether to replace the first hyperlink with a replacement hyperlink selected from the one or more second hyperlink based, at least in part, on a result of an analysis of similarity of the first hyperlink compared to each of the one or more second hyperlink.

Code instructions to cause the client terminal to access either the first website associated with the first hyperlink or a second website associated with the replacement hyperlink based on the determination.

The client terminal may include the one or more processors executing the code. The code further comprises code instructions to extract the first hyperlink from a digital document having at least a portion thereof rendered by an application executed by the one or more processor.

A hyperlink classification system may include the one or more processors executing the code. The code further comprises code instructions to receive the first hyperlink from the client terminal.

A network monitoring hyperlink classification system may include the one or more processor executing the code. The code further comprises code instructions to monitor network traffic from the client terminal in order to intercept the first hyperlink.

According to some examples of the present invention there is provided a software program product, comprising a non-transitory computer readable storage medium which stores:

First program instructions to obtain a first hyperlink associated with a first website accessible via a client terminal.

Second program instructions to convert one or more portions of the first hyperlink into a query comprising one or more search term derived, at least in part, from the one or more portions of the first hyperlink.

Third program instructions to submit the query to one or more search engines configured to search for information via the internet.

Fourth program instructions to receive, from the one or more search engines, search results associated with the query. The search results include one or more of a plurality of second hyperlinks.

Fifth program instructions to determine whether to replace the first hyperlink with a replacement hyperlink selected from the one or more second hyperlinks based, at least in part, on a result of an analysis of similarity of the first hyperlink compared to each of the one or more second hyperlink.

Sixth program instructions to cause the client terminal to access either the first website associated with the first hyperlink or a second website associated with the replacement hyperlink based on the determination. The first, second, third, fourth, fifth and sixth program instructions are executed by one or more computerized processors from the non-transitory computer readable storage medium.

Certain features of the examples described herein, which are, for clarity, described in the context of separate examples, may also be provided in combination in a single example. Conversely, various features of the examples described herein, which are, for brevity, described in the context of a single example, may also be provided separately or in any suitable sub-combination or as suitable in any other described example of the disclosure. Certain features described in the context of various examples are not to be considered essential features of those examples, unless the example is inoperative without those elements.

What is claimed is:

1. A computer implemented method, comprising:
obtaining a first hyperlink associated with a first web resource accessible via a client terminal;
converting at least one portion of the first hyperlink into a query comprising at least one search term derived, at least in part, from the at least one portion of the first hyperlink;
submitting the query to at least one search engine configured to search for information via the internet;
receiving, from the at least one search engine, search results associated with the query, the search results including a plurality of second hyperlinks;
determining whether to replace the first hyperlink with a replacement hyperlink selected from at least a subset of the plurality of second hyperlinks based, at least in part, on a result of an analysis of similarity of the first hyperlink compared to each second hyperlink of the at least a subset of the plurality of second hyperlinks; and
causing the client terminal to access either the first web resource associated with the first hyperlink or a second web resource associated with the replacement hyperlink based on the determination.

2. The computer implemented method of claim 1, wherein the web resource is a member selected from a group consisting of: a website, a server and a domain.

3. The computer implemented method of claim 1, wherein the hyperlink is a member selected from a group consisting of: a uniform resource indicator (URI), a uniform resource locator (URL), a domain name and a website address.

4. The computer implemented method of claim 1, wherein the first hyperlink is extracted from a digital document having at least a portion thereof rendered by an application executed by a processor of the client terminal.

5. The computer implemented method of claim 1, wherein the first hyperlink is received from the client terminal.

6. The computer implemented method of claim 1, wherein the first hyperlink is extracted from a network traffic from the client terminal by monitoring the network traffic to intercept the first hyperlink.

7. The computer implemented method of claim 1, further comprising limiting a number of the plurality of second hyperlinks prior to the analysis.

8. The computer implemented method of claim 1, wherein the similarity is at least one of a syntactic similarity, a semantic similarity and a visual similarity.

9. The computer implemented method of claim 8, wherein the analysis includes at least one of a syntactic analysis, a semantic analysis and a visual analysis.

10. The computer implemented method of claim 1, wherein the analysis evaluates a similarity of the first hyperlink compared to the at least one of a plurality of second hyperlinks.

11. The computer implemented method of claim 1, wherein the analysis produces a similarity score for the each of the at least one of a plurality of second hyperlinks to identify the replacement hyperlink having a highest similarity score, the similarity score is calculated by analyzing a respective one of the at least one second hyperlink compared to the first hyperlink.

12. The computer implemented method of claim 1, further comprising replacing the first hyperlink with a previously used hyperlink by analyzing the first hyperlink compared to each of at least one of a plurality of previously used hyperlinks previously used by the client terminal.

13. The computer implemented method of claim 1, further comprising identifying a candidate hyperlink to replace the first hyperlink when the search results include none of the plurality of second hyperlinks by applying the first hyperlink to a text completion predictive engine of the at least one search engine which predicts the at least one of a plurality of second hyperlinks from the first hyperlink.

14. The computer implemented method of claim 1, wherein the replacement hyperlink is the second hyperlink that, according to the result of the analysis, is most similar to the first hyperlink.

15. A system, comprising:
at least one processor; and
memory including computer-executable instructions that, based on execution by the at least one processor, configure the at least one processor to:
obtain a first hyperlink associated with a first web resource accessible via a client terminal;
convert at least one portion of the first hyperlink into a query comprising at least one search term derived, at least in part, from the at least one portion of the first hyperlink;
submit the query to at least one search engine configured to search for information via the internet;
receive, from the at least one search engine, search results associated with the query, the search results including a plurality of second hyperlinks;
determine whether to replace the first hyperlink with a replacement hyperlink selected from at least a subset of the plurality of second hyperlinks based, at least in part, on a result of an analysis of similarity of the first hyperlink compared to each second hyperlink of the at least a subset of one plurality of second hyperlinks; and
cause the client terminal to access either the first web resource associated with the first hyperlink or a second web resource associated with the replacement hyperlink based on the determination.

16. The system of claim 15, wherein the client terminal comprises the at least one processor executing the code, the code further comprises code instructions to extract the first hyperlink from a digital document having at least a portion thereof rendered by an application executed by the at least one processor.

17. The system of claim 15, wherein a hyperlink classification system comprises the at least one processor executing the code, the code further comprises code instructions to receive the first hyperlink from the client terminal.

18. The system of claim 15, wherein a network monitoring hyperlink classification system comprises the at least one processor executing the code, the code further comprises code instructions to monitor a network traffic from the client terminal in order to intercept the first hyperlink.

19. The system of claim 15, wherein the replacement hyperlink is the second hyperlink that, according to the result of the analysis, is most similar to the first hyperlink.

20. A software program product, comprising:
a non-transitory computer readable storage medium;
first program instructions to obtain a first hyperlink associated with a first web resource accessible via a client terminal;
second program instructions to convert at least one portion of the first hyperlink into a query comprising at least one search term derived, at least in part, from the at least one portion of the first hyperlink;
third program instructions to submit the query to at least one search engine configured to search for information via the internet;
fourth program instructions to receive, from the at least one search engine, search results associated with the query, the search results including a plurality of second hyperlinks;
fifth program instructions to determine whether to replace the first hyperlink with a replacement hyperlink selected from at least a subset of the plurality of second hyperlinks based, at least in part, on a result of an analysis of similarity of the first hyperlink compared to each second hyperlink of the at least a subset of the plurality of second hyperlinks; and
sixth program instructions to cause the client terminal to access either the first web resource associated with the first hyperlink or a second web resource associated with the replacement hyperlink based on the determination;
wherein the first, second, third, fourth, fifth and sixth program instructions are executed by at least one computerized processor from the non-transitory computer readable storage medium.

21. The software program product of claim 20, wherein the replacement hyperlink is the second hyperlink that, according to the result of the analysis, is most similar to the first hyperlink.

* * * * *